United States Patent [19]

Myers et al.

[11] Patent Number: 4,464,899

[45] Date of Patent: Aug. 14, 1984

[54] BRAKE BOOSTER

[75] Inventors: Lawrence R. Myers, South Bend, Ind.; Robert F. Gaiser, Stevensville; Larry G. Lohraff, Berrien Springs, both of Mich.; Lloyd G. Bach, South Bend, Ind.

[73] Assignee: The Bendix Corporation, Southfield, Mich.

[21] Appl. No.: 371,154

[22] Filed: Apr. 23, 1982

[51] Int. Cl.³ .............................................. B60T 13/12
[52] U.S. Cl. .................................... 60/547.1; 60/581; 60/553
[58] Field of Search ...................... 60/581, 547.1, 551, 60/552, 554, 553, 548, 582; 188/345; 303/6 R

[56] References Cited

FOREIGN PATENT DOCUMENTS

| 0723514 | 12/1965 | Canada .............................. 60/547.1 |
| 2312641 | 9/1974 | Fed. Rep. of Germany ...... 188/345 |
| 2060797 | 5/1981 | United Kingdom .................. 60/581 |

Primary Examiner—William R. Cline
Assistant Examiner—Randolph A. Smith
Attorney, Agent, or Firm—Paul D. Schoenle; Ken C. Decker

[57] ABSTRACT

A brake booster (16) includes a housing (26) with a plurality of parallel bores (38, 40, 42). A first piston (50) is disposed in the bore (38), a second piston (56) is disposed in the bore (40) and a valve assembly (74) is disposed in the bore (42) to control communication of fluid pressure to a pair of working chambers (52, 58) within the bores (38, 40). A pair of connecting pins (130, 132) cooperate with a plunger (100) to transmit a reaction force to a vehicle operator.

6 Claims, 1 Drawing Figure

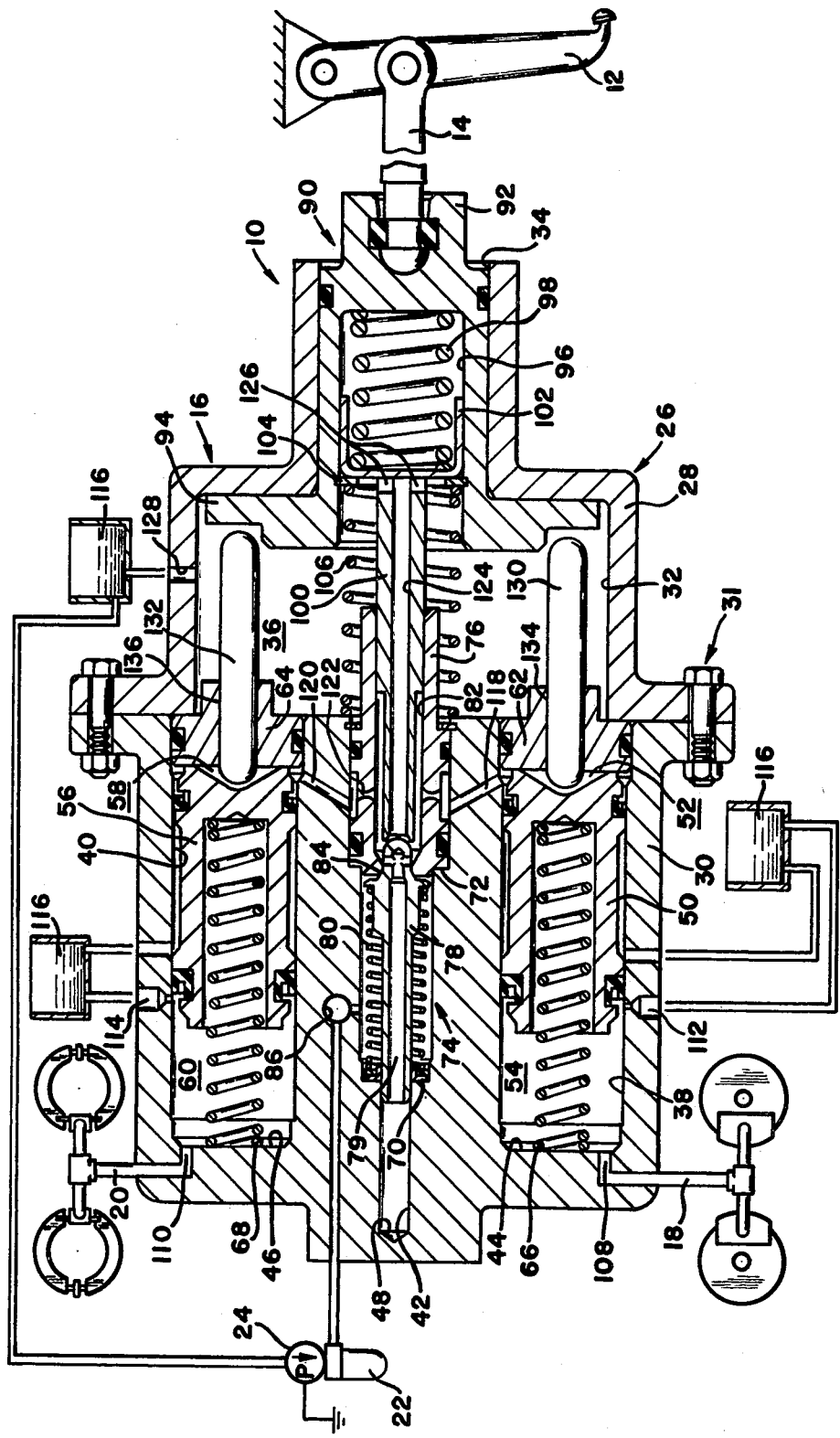

BRAKE BOOSTER

This invention relates to a brake booster cooperating with a vehicle to provide a power assist during a brake application. More particularly, the brake booster comprises a full power type wherein a fluid pressure accumulator is selectively communicated to a pair of working chambers to impart movement to a pair of pistons.

A brake booster having a housing with a first bore receiving a first piston and a second bore receiving a second piston, the pistons cooperating with the housing to substantially define first pressure and working chambers and second pressure and working chambers, respectively, the pressure chambers communicating via housing outlet ports with respective brake circuits, the working chambers communicating with valve means disposed within the housing, the valve means being operable during a brake application to control communication of fluid pressure from a housing inlet to the working chambers, and an input assembly extending into the housing and cooperating with the valve means to control operation of the same.

In U.S. Pat. No. 3,459,226 (Schultz) a pair of valve assemblies are disposed within a housing in parallel relation. The valve assemblies are simultaneously operated by an input assembly to communicate fluid pressure from a pair of accumulators to a pair of brakes. The teachings of Schultz required a valve assembly for each brake and in the event of failure of one valve assembly the brake booster relied upon the operation of the other valve assembly to provide a power assist. Consequently, if both valve assemblies failed the brake booster was inoperable.

The brake booster of the present invention is characterized in that said first and second bores are arranged in parallel relation within said housing and said valve means being operable during braking to communicate fluid pressure to both of said working chambers and said valve means is disposed within said housing substantially in alignment with and intermediate with said first and second pistons to compactly dispose said pistons and valve means within said housing.

It is an advantage of the present invention that a simple compact booster is provided such that a single valve assembly is utilized to control communication of fluid pressure to both working chambers.

The sole FIGURE illustrates a braking system with a brake booster constructed in accordance with the present invention shown in cross section.

The brake system 10 includes a brake pedal 12 connected via an input rod 14 with a brake booster 16. The brake booster 16 communicates with a first brake circuit 18 and a second brake circuit 20. These brake circuits are illustrated as conventional axle to axle; however, the brake booster 16 could also be used with a cross-split brake circuit. An accumulator 22 is charged with fluid pressure by means of a pump 24 which can be driven by an electric motor or by an engine belt and pulley.

The brake booster 16 includes a housing 26 comprising a first part 28 and a second part 30 which are secured together by bolt and nut assemblies 31. The first part 28 defines a stepped bore 32 extending from an open end 34 to a chamber 36. The second part 30 defines a first bore 38, a second bore 40 and a third bore 42 intermediate the first and second bores. The bores 38, 40 and 42 extend from respective bottom walls 44, 46 and 48 to the chamber 36. The bore 38 receives a first piston 50 sealingly engaging the wall of bore 38 to define a first working chamber 52 and a first pressure chamber 54. Similarly, the bore 40 receives a second piston 56 sealingly engaging the wall of bore 40 to define a second working chamber 58 and a second pressure chamber 60. A first plug 62 is disposed within the bore 38 to define a rest position for the piston 50 and a second plug 64 is disposed within the bore 40 to define a rest position for the piston 56. A pair of springs 66 and 68 are disposed within chambers 54 and 60, respectively, to bias the pistons 50 and 56 to their respective rest positions engaging the plugs 62 and 64.

The third bore 42 is stepped to define shoulders 70 and 72. A valve assembly 74 is disposed within the third bore. The valve assembly includes a valve set 76 in abutment with shoulder 72 and a valve member 78 biased into engagement with the valve seat 76 by means of a spring 80 extending from the shoulder 70 to the valve member 78. The valve seat 76 forms a bore 82 leading to an opening 84. The valve member 78 extends into the opening 84 to engage the wall of the opening 84, thereby losing communication between the bore 82 and the bore 42 between shoulders 70 and 72. This section of the bore 42 between the shoulders is in communication with the accumulator 22 via an inlet 86.

An input assembly 90 is connected with the input rod 14. The input assembly 90 includes a piston 92 sealingly and movably engaging the wall of bore 32 adjacent opening 34. The piston 92 includes a radially extending flange 94 within chamber 36 and a recess 96 receives a spring 98. The input assembly 90 also includes a plunger 100 extending into the valve seat bore 82 and opposing the valve member 78. A cap 102 is engageable with the end of the plunger 100 and a piston snap ring 104 defines a rest position for the cap 102. A spring 106 extends from the housing part 30 to the snap ring 104 to oppose movement of the piston 92 and separation between the flange 94 and the housing part 28.

The housing part 30 defines outlet ports 108 and 110 communicating the first pressure chamber 54 with the brake circuit 18 and the second pressure chamber 60 with the brake circuit 20. A pair of compensation ports 112 and 114 on the housing part 30 communicate the pressure chambers 54 and 60 with reservoirs 116 in the rest condition. The housing part 30 defines a pair of passages 118 and 120 extending from the bore 42 to the bores 38 and 40 to communicate the working chambers 52 and 58 with the valve assembly 74 and the valve assembly seat 76 includes restricted orifices 122 communicating the seat bore 82 with the passages 118 and 120. The plunger 100 forms an axially extending bore 124 to communicate the working chambers 52 and 58 with the chamber 36 via radial openings 126 adjacent the cap 102. The chamber 36 is continuously open to the reservoirs 116 via an outlet 128.

A pair of pins 130 and 132 are movably carried by the plugs 62 and 64 by means of plug openings 134 and 136, respectively. In the rest position illustrated, the pins 130 and 132 are spaced from the piston flange 94 and the pistons 50 and 56. The pins are movably disposed within the openings 134 and 136 to be pressure responsive to the fluid pressure communicated to their associated working chambers. The pair of pins 130 and 132 provide a connection between the piston flange 94 and the pistons 50 and 56 in the event of a failure in the fluid pressure system.

The brake booster 16 is shown in the rest position so that the pistons 50 and 56 are in abutment with their respective plugs 62 and 64, the input piston flange 94 is in abutment with the housing 28, and the pins 130 and 132 define a gap either with the flange or pistons or both. Fluid pressure from the accumulator is in communication with the bore 42 between the shoulders 70 and 72; however, since the valve member diameter is substantially the same at the opening 84 as at the left end, the valve member is pressure balanced and the spring 80 maintains the valve member 78 in engagement with the valve seat 76 to close fluid communication between the accumulator and the working chambers. The plunger 100 is spaced from the valve member 78 to open the bore 124 to the working chambers so that the latter are opened to the reservoirs 116. During a brake application, the brake pedal 12 is pivoted clockwise to move the input rod 14 and piston 92 to the left. The snap ring 104 moves with the piston to contract the spring 106. Initially the spring 98 moves with the piston in an extended condition to move the plunger 100 to the left.

If the gap at the pins 130 and 132 is greater than the spacing between the plunger 100 and the valve member 78 during initial braking, the valve member will be opened before the gap is taken up at the pins 130 and 132 between the flange 94 and the pistons 50 and 56. When the plunger 100 engages the valve member 78 and separates the latter from the valve seat 76, fluid pressure is communicated to the bore 82 and to the working chambers via the restricted orifices 122 and the passages 118 and 120. The valve member 78 defines a passage 79 to communicate fluid pressure to the left end of the valve member so that the latter is pressure balanced during the brake application. The fluid pressure within the bore 82 acts against the plunger to bias the latter to the right against spring 98. Also, the fluid pressure within the working chambers acts against the pistons to cause the latter to move to the left, thereby pressurizing the fluid trapped in the first and second pressure chambers. The fluid pressure in the working chambers also acts against the pins to oppose movement of the latter to the left and simultaneously biases the pins into engagement with the flange 94. The pins cooperate with the plunger to generate a reaction force opposing movement of the piston 92 to the left. This follows from the fluid pressure acting against the plunger and pins. Consequently, three reaction areas are provided and during initial braking fluid pressure communicated to the working chambers will act against these reaction areas to gradually generate a reaction force proportional to the output force acting against the pistons.

Further braking causes the spring 98 to contract slightly while the valve member 78 is modulating between an open position and a closed position, thereby increasing communication of fluid pressure to the working chambers. At this time the piston flange 94 pushes the pins 130 and 132 into the working chambers to decrease the gap between the pins 130 and 132 and the pistons. The pistons move further to the left to contract their associated springs 66 and 68 and increase fluid pressure within the pressure chambers and brake circuits. Beyond further braking, the input assembly 90 is moved to the left so that the plunger 100 pushes the valve member 78 to the left toward the end of bore 42 near bottom wall 48. Alternatively, depending on the selected spring constants for springs 98 and 80, the input assembly piston 92 is movable relative to the plunger 100 so that the latter is received within the recess 96 to further contract spring 98. In addition, the input assembly 90 moves to the left to connect the pins 130 and 132 with the pistons 50 and 56 so that further movement of the input assembly 90 to the left increases fluid pressure in the chambers 54 and 60.

Upon termination of braking the force on the pedal 12 is relieved by the vehicle operator so that the spring 106 biases the piston 92 to move to the right. The fluid pressure acting against the plunger and pins also biases the piston 92 to move to the right. The plunger 100 and the valve member move to the right to engage the valve member with the valve seat and separate the plunger from the valve member. Consequently, fluid pressure within the working chambers is vented to chamber 36 via openings 118, 120 and 122 so that the springs 66 and 68 move the pistons toward the plugs.

If the gap at the pins 130 and 132 is less than the spacing between the plunger 100 and the valve member 78, during initial braking the vehicle operator will move the input assembly against the force of springs 106, 66 and 68 until the plunger 100 moves the valve member 78 to an open position to define a delayed pressure reaction against the plunger and pins.

During termination of braking, the pins move to the right with the flange 94 in response to fluid pressure in the working chambers. When the fluid pressure in the working chambers is vented to the chamber 36, the pins remain substantially stationary relative to the plugs, while the piston 92 continues to move to the right until the flange 94 is abutting the housing part 28. The pistons 50 and 56 move to the right to engage the plugs but remain spaced from the pins. Consequently, the gap between the pins and the flange 94 and/or the gap between the pins and the pistons are reestablished.

In the event of a failure in the pump, accumulator, valve assembly, or associated lines the input piston 92 is movable to the left by the pedal 12 to mechanically push the pistons 50 and 56 to the left via the pins 130 and 132 to provide a connection between the input piston 92 and the pistons 50 and 56 during a manual brake application. In the failure mode, the valve member 78 is moved to the left to contract the spring 80 and the plunger is moved into the recess 96 to contract spring 98.

It is feasible for one skilled in the art to include sealing rings between the plugs and pins should the sliding fit not provide adequate sealing for the working chambers. Also, the plunger and seat could be provided with a sealing ring therebetween.

We claim:

1. A brake booster having a housing with a first bore receiving a first piston and a second bore receiving a second piston, the pistons cooperating with the housing to substantially define first pressure and working chambers and second pressure and working chambers, respectively, the pressure chambers communicating via housing outlet ports with respective brake circuits the working chambers communicating with valve means disposed within the housing, the valve means being operable during a brake application to control communication of fluid pressure from a housing inlet to the working chambers, and an input assembly extending into the housing and cooperating with the valve means to control operation of the same, characterized in that said first and second bores are arranged in parallel relation within said housing and said valve means being operable during braking to communicate fluid pressure to both of said working chambers, said valve means being disposed within said housing substantially in alignment with and intermediate said first and second pistons to compactly dispose said pistons and valve means within said housing said housing defining a third bore receiving said valve means and said housing includes at least two passages extending from the third bore to the first and second bores, respectively, to provide fluid communication from said valve means to both of said working chambers, said valve means including a seat with an axially extending opening, said input assembly being movably disposed within said axially extending opening and said seat including a restricted aperture communicating with said passages.

2. The brake booster of claim 1 in which connecting means are disposed between said pistons and said input assembly to permit said input assembly to move said pistons during the brake application when the fluid pressure communicated to the working chambers fails to move said pistons.

3. The brake booster of claim 2 in which said connecting means are exposed to the fluid pressure communicated to the working chambers and are also engageable with said input assembly to provide a reaction force for the input assembly when the fluid pressure is communicated with the working chambers.

4. The brake booster of claim 1 in which said housing comprises a two-part assembly, one of said parts defining three blind bores for receiving said pistons and said valve means, and the other of said parts defining a bore for receiving said input assembly.

5. The brake booster of claim 2 in which said input assembly includes a plunger engageable with said valve means, said plunger cooperating with said connecting means to define three separate areas exposed to the fluid pressure within the housing so that the fluid pressure acts against said three separate areas to provide a reaction force opposing movement of said input assembly during the brake application.

6. The brake booster of claim 1 in which connecting means are disposed between said input assembly and said pistons said connecting means defining a lost motion connection between said pistons and said input assembly to provide for separation between said pistons and said connecting means during the brake application.

* * * * *